(12) United States Patent
Meringer et al.

(10) Patent No.: US 11,292,595 B2
(45) Date of Patent: Apr. 5, 2022

(54) UNMANNED FLYING DEVICE

(71) Applicant: Ascent AeroSystems Inc., Syracuse, NY (US)

(72) Inventors: Jonathan R. Meringer, Syracuse, NY (US); Nathaniel R. Meringer, Syracuse, NY (US)

(73) Assignee: Ascent AeroSystems Inc., Wilmington, MA (US)

( * ) Notice: Subject to any disclaimer, the term of this patent is extended or adjusted under 35 U.S.C. 154(b) by 350 days.

(21) Appl. No.: 16/151,637

(22) Filed: Oct. 4, 2018

(65) Prior Publication Data

US 2019/0092466 A1 Mar. 28, 2019

Related U.S. Application Data

(63) Continuation of application No. 14/936,822, filed on Nov. 10, 2015, now Pat. No. 10,093,417.

(60) Provisional application No. 62/077,783, filed on Nov. 10, 2014.

(51) Int. Cl.
*B64C 27/10* (2006.01)
*B64C 27/50* (2006.01)
*B64C 39/02* (2006.01)
*B64C 27/00* (2006.01)

(52) U.S. Cl.
CPC .......... *B64C 39/024* (2013.01); *B64C 27/006* (2013.01); *B64C 27/10* (2013.01); *B64C 27/50* (2013.01); *B64C 2201/108* (2013.01); *B64C 2201/18* (2013.01)

(58) Field of Classification Search
CPC ....... B64C 11/28; B64C 27/022; B64C 27/50; B64C 2201/18
See application file for complete search history.

(56) References Cited

U.S. PATENT DOCUMENTS

| | | | |
|---|---|---|---|
| 2,869,649 A | 1/1959 | Dieter | |
| 3,142,455 A | 7/1964 | Wilford | |
| 3,321,021 A | 5/1967 | Girard | |
| D210,754 S | 4/1968 | Lang | |
| 3,669,371 A | 6/1972 | Romhild et al. | |
| 3,957,229 A | 5/1976 | Davis | |
| 4,284,387 A | 8/1981 | Ferris | |
| 4,478,379 A | 10/1984 | Kerr | |
| 7,510,142 B2 | 3/2009 | Johnson | |
| 7,712,701 B1 | 5/2010 | Ehrmantraut et al. | |
| 7,789,341 B2 | 9/2010 | Arlton et al. | |
| 7,854,410 B2 | 12/2010 | Fanucci et al. | |
| 7,985,048 B2 | 7/2011 | Jones | |
| 8,083,173 B2 | 12/2011 | Arlton et al. | |
| 8,146,854 B2 | 4/2012 | Lawrence | |
| 8,459,948 B2 | 6/2013 | Caraballoso et al. | |

(Continued)

*Primary Examiner* — Joseph W Sanderson
(74) *Attorney, Agent, or Firm* — Carmody Torrance Sandak & Hennessey LLP

(57) ABSTRACT

An unmanned flying device including a body; a first blade and at least a second blade; a coupling assembly for coupling the first blade and the at least second blade to the body, wherein the coupling assembly urges the collapsing of the first blade and the at least second blade towards the body; and wherein both the first blade and the at least second blade are rotatable about the body, and wherein the first blade and the at least second blade are deployable away from the body via rotation of the first and the at least second blades about the body.

15 Claims, 9 Drawing Sheets

(56) References Cited

U.S. PATENT DOCUMENTS

| | | | |
|---|---|---|---|
| 8,469,307 B2 | 6/2013 | Arlton et al. | |
| 8,888,551 B2 | 11/2014 | Xu | |
| 9,981,744 B2 * | 5/2018 | Choo | B64C 39/02 |
| 10,093,417 B2 * | 10/2018 | Meringer | B64C 27/10 |
| 10,279,898 B2 * | 5/2019 | Green | B64C 27/08 |
| 11,027,840 B2 * | 6/2021 | Zhang | G05D 1/0094 |
| 2005/0051667 A1 | 3/2005 | Arlton et al. | |
| 2006/0011777 A1 * | 1/2006 | Arlton | B64C 39/024 |
| | | | 244/7 B |
| 2009/0081043 A1 | 3/2009 | Jones | |
| 2009/0212157 A1 | 8/2009 | Arlton et al. | |
| 2010/0012774 A1 | 1/2010 | Fanucci et al. | |
| 2011/0155840 A1 | 6/2011 | Lind, Jr. et al. | |
| 2014/0299708 A1 | 10/2014 | Green et al. | |
| 2016/0122012 A1 * | 5/2016 | Choo | B64C 39/02 |
| | | | 244/17.23 |

* cited by examiner

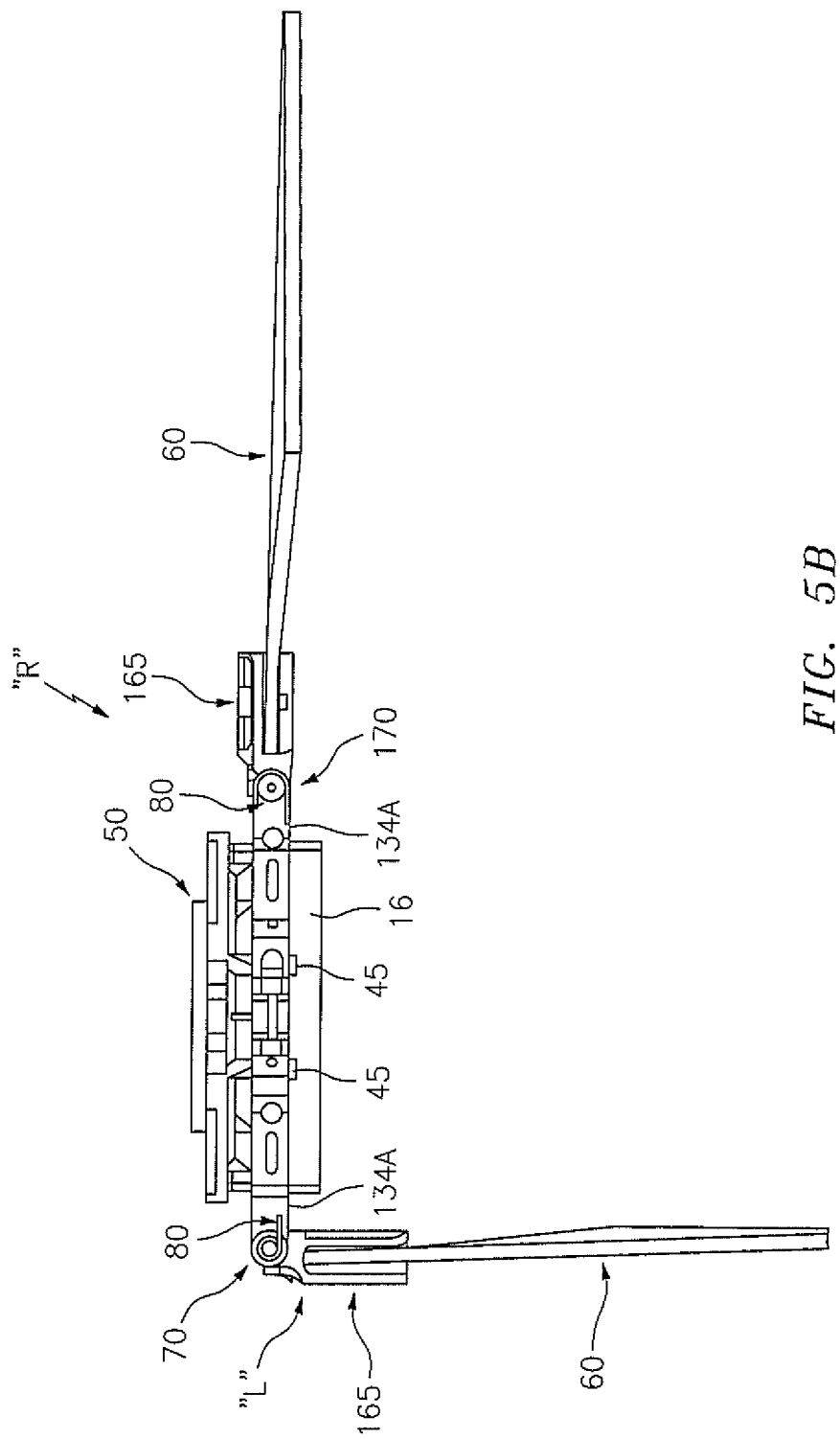

UNMANNED FLYING DEVICE

CROSS REFERENCE TO RELATED APPLICATION

This application claims the benefit of U.S. Application Ser. No. 62/077,783 filed on Nov. 10, 2014. The subject matter of said provisional application is incorporated by reference as if fully set forth herein.

BACKGROUND OF THE INVENTION

The present invention is directed to unmanned flying devices, and in particular, to an unmanned flying device construction that provides for a collapsing or folding of the device's rotor blades upon a decrease or absence of rotor blade rotation about the device's body and for the deployment of the rotor blades away from the device's body upon a rotation thereof about the device's body. Such a construction, among other things, assists in preventing or minimizing damage to the device during a landing without the need for landing gear or other structure that may otherwise perform the function thereof.

Unmanned flying devices, also commonly referred to as "drones," are well-known and becoming more popular. In all of the known examples, the rotor assemblies provide for the rotor blades to always be biased towards immediate deployment. For example, U.S. Publication No. 2009/0212157 describes the use of a torsion spring for biasing each blade away from their folded or retracted configuration. On the other hand, others have appeared to recognize that always maintaining the rotor blades in a deployed position is less than desirable for storage and/or during landing. For example, U.S. Pat. No. 8,469,307 describes blades that can fold upward or downward 90 degrees for storage or during a crash landing. However, as best understood, the device described in U.S. Pat. No. 8,469,307 still lends itself to damage and/or injury to persons.

It is thus believed that further advances to the state of the art are both desirable and achievable. In particular, it is desirable and achievable to provide an unmanned flying device that is compact, durable, and low cost to manufacture and in particular, provides for an improved blade and rotor arrangement in which the device's compactness and safety, and the minimization of damage to the device itself, is maximized through an improved blade collapsing assembly.

SUMMARY AND OBJECTIVES OF THE INVENTION

It is thus an objective of the present invention to overcome the perceived deficiencies in the prior art.

It is yet another objective of the present invention to provide an improved unmanned flying device construction that can be utilized for a variety of applications, including aerial surveillance, amusement (e.g. toy helicopters), and the delivery of items.

It is yet another objective of the present invention to provide an improved unmanned flying device construction that can overcome the bulky and awkward designs, fragile blades, and high cost of manufacture found in prior art devices.

It is yet another objective of the present invention to provide an improved unmanned flying device construction that is both convenient and practical to use, and that is also compact, durable and can be manufactured at a relatively low cost.

It is a further objective and feature of the present invention to provide an improved unmanned flying device that is easy to transport.

It is a further objective and feature of the present invention to provide an unmanned flying device that includes a symmetrical drone-like body.

It is a further objective and feature of the present invention to provide an unmanned flying device that includes blades which are biased towards folding to conform to the body of the unmanned flying device so as to minimize or prevent, among other things, damage to the device itself upon a landing or crash.

It is a further objective and feature of the present invention to provide such an unmanned flying device that includes blades that are spring loaded to automatically fold to conform to the body of the unmanned flying device.

It is a further objective and feature of the present invention to provide an unmanned flying device including at least one body and at least two foldable blades coupled to said body of the unmanned flying device, whereby rotation of said blades causes said blades to extend and deploy via centrifugal forces and aerodynamic lifting forces due to the rotation thereof, wherein said blades provide a propulsive lift when spun.

It is a further objective and feature of the present invention to provide an unmanned flying device that includes at least one collapsing element coupling said blades to said body of the unmanned flying device, said collapsing element biasing said blade to a folded position when not rotating.

Still a further objective of the present invention is to provide methodologies for carrying out and/or facilitating the foregoing.

Further objects and advantages of this invention will become more apparent from a consideration of the drawings and ensuing description.

The invention accordingly comprises the features of construction, combination of elements, arrangement of parts and sequence of steps which will be exemplified in the construction, illustration and description hereinafter set forth, and the scope of the invention will be indicated in the claims.

Therefore, to overcome the perceived deficiencies in the prior art and to achieve the objects and advantages set forth above and below, a preferred embodiment of the present invention is, generally speaking, directed to an unmanned flying device comprising a body; a first blade and at least a second blade; a coupling assembly for coupling the first blade and the at least second blade to the body, wherein the coupling assembly urges the collapsing of the first blade and the at least second blade towards the body; and wherein both the first blade and the at least second blade are rotatable about the body, and wherein the first blade and the at least second blade are deployable away from the body via rotation of the first and the at least second blades about the body.

In another preferred embodiment a method of landing an unmanned flying device is provided, wherein the device comprises a body, a first blade and at least a second blade, a coupling assembly for coupling the first blade and the at least second blade to the body, wherein the coupling assembly urges the collapsing of the first blade and the at least second blade towards the body, wherein both the first blade and the at least second blade are rotatable about the body, and wherein the first blade and the at least second blade are deployable away from the body via rotation of the first and the at least second blades about the body; and wherein the method comprises the steps of decreasing a rotational speed of the first blade and the at least second blade; and causing the first blade and the at least second blade to collapse toward the body; wherein the collapsing of the first blade and the at least second blade toward the body takes place prior to the landing of the device on a surface.

In a preferred embodiment, the unmanned flying device is what would commonly be referred to in the art as a "drone."

BRIEF DESCRIPTION OF THE DRAWINGS

The above set forth and other features of the invention are made more apparent in the ensuing Description of the Preferred Embodiments when read in conjunction with the attached Drawings, wherein:

FIG. 5B is an enlarged view of the bottom rotor of another preferred embodiment of the unmanned flying device of the present invention, illustrating a different coupling assembly that utilizes a single torsion spring in each rotor arm and which also helps achieve the advantages and objectives as set forth herein.

Identical reference numerals in the figures are intended to indicate like parts, although not every feature in every figure may be called out with a reference numeral.

DETAILED DESCRIPTION OF THE PREFERRED EMBODIMENTS

Generally speaking, the present invention is directed to embodiments of unmanned flying devices all having compact constructions capable of leveraging their overhead position or perspective to aid a user or group. The preferred embodiments of unmanned flying devices as set forth herein are preferably sized to be convenient for a single person to carry by hand or in a bag or case, but larger embodiments are contemplated depending on the desired application.

The preferred embodiments all preferably comprise a coaxial rotor design preferably comprising a pair of rotors aligned on a central axis. Embodiments including other rotor configurations including a quadcopter or multicopter configurations are also contemplated herein. Each rotor preferably comprises two or more aerodynamic blades, which provide propulsive lift when spun. While and when not spinning, these aerodynamic blades automatically fold, collapse or retract along the body of the unmanned flying device to, among other things, minimize or prevent damage to the device itself upon a landing or crash and make the device more convenient to pack and transport. The unmanned flying device can be remotely controlled by a user using communications such as radio control (R/C), Bluetooth, a tether or other appropriate means. The device could also operate autonomously, making and directing flight decisions with an onboard computer processor or microcontroller as well as the necessary supporting electrical sensors, motors, speed controllers and other components as would be understood in the art.

Reference is thus first made generally to FIGS. 1, 1A, 2 and 3, which illustrate an unmanned flying device, generally indicated at 10, constructed in accordance with a first preferred embodiment of the present invention.

According to this preferred embodiment, unmanned flying device 10 comprises three (3) aerodynamics shells, generally indicated at 12, 14, 16, which encase a central tube or shaft 25 about which the rotors, generally indicated at 32, 34, of unmanned flying device 10 spin. Shaft 25 is preferably made out of a strong, stiff and lightweight material such as pultruded carbon fiber, plastic or aluminum and may be continuous or separated into pieces all as would be understood in the art. In this first preferred embodiment, central supporting shaft 25 is constructed from a pultruded carbon fiber tube approximately 10 inches long, 0.40 inches in outer diameter, and is preferably provided in two sections, which allows electrical wires to be routed inside thereof. Under appropriate circumstances, considering such issues as design preference, user preferences, marketing preferences, cost, structural requirements, available materials, technological advances and the like, alternative embodiments are also contemplated where the central supporting shaft 25 might have a varying diameter or deviate from a circular cross-section and may span all or some of the unmanned flying device's length.

Figure 3:
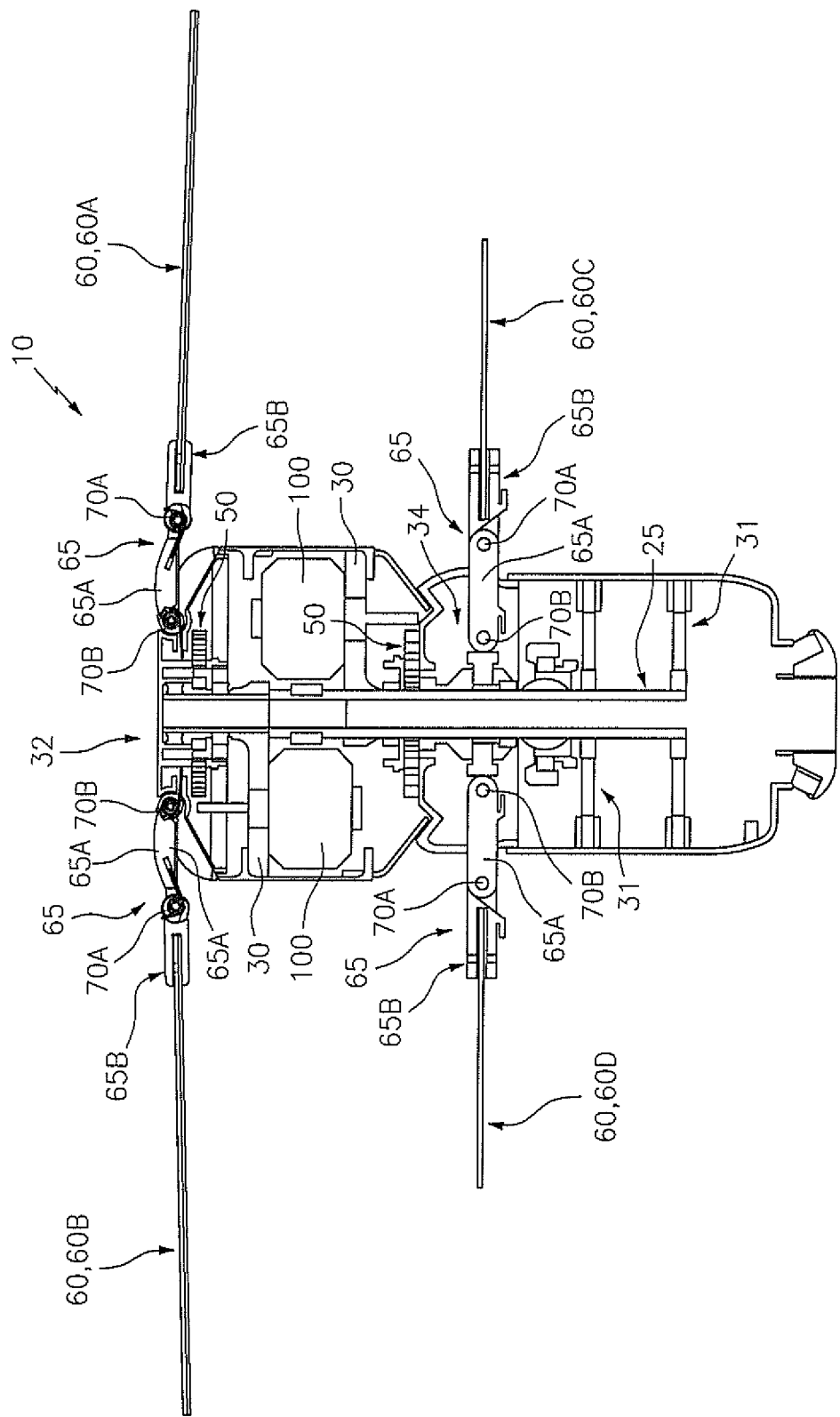
FIG. 3 is a cross-sectional view of the unmanned flying device illustrated in FIGS. 1, 1A and 2, wherein the rotor blades are illustrated in their extended or "deployed" position.

Mounted to shaft 25 are supporting members, bulkheads and brackets. The brackets, such as a support bracket 30, allow for the attachment of motors, electronics, servo motors and other necessary components. These supporting members, bulkheads and brackets also provide a means to attach surrounding aerodynamic shells, such as 12 and 14 to a vehicle's central shaft 25. Bulkheads 31 shown in FIG. 3 are examples of supporting members in this embodiment used to couple aeroshell 14 to a central shaft 25.

Preferably, these supporting members, bulkheads and brackets are constructed from plastic and fixed to the central shaft 25 by gluing, mechanical interference, friction fit or set screws, or other suitable methods. The brackets and bulkheads are sized to remain within the envelope of the surrounding aerodynamic shells 12, 14, and in certain preferred embodiments, are sized just large enough to interface with them. In alternative preferred embodiments, the brackets and bulkheads may be sized to protrude past the aerodynamic shells. These bulkheads and brackets position and support the motor, servomotors, batteries and other mechanical and electrical components using screws, glue or other appropriate fastening methods.

Aerodynamic shells 12, 14 form an outer boundary, encasing and protecting the aircraft's internal components. Shells 12, 14 are sized so they do not negatively impact the air flow of the rotors while still being large enough to encase all or some of the unmanned flying device's internal components. Shells 12, 14 are preferably constructed from appropriately strong and stiff, lightweight materials such as plastics or composites. Depending on the circumstances, considering such issues as design preference, user preferences, marketing preferences, cost, structural requirements, available materials, technological advances, or the like, shells 12, 14 may be provided into sections or made continuous and cover all or some of the unmanned flying device. Shells 12, 14 shroud the components below and between the rotors 32, 34, while shell 16 shrouds the swashplate and bottom rotor 34. Aerodynamic shell 16 is preferably coupled to the bearing of rotor 34 on the central shaft 25 and therefore spins with bottom rotor 34. However, alternative embodiments are contemplated hereby. Preferably, shells 12, 14 attach to the central shaft 25 by means of mechanical interference with bulkheads and support brackets.

Generally speaking, device 10 comprises an upper rotor assembly and a lower assembly, each of the assemblies comprising among other things, a rotor, a rotor hub and a rotor bracket as will be discussed in greater detail below. The coupling of a rotor, rotor hub and rotor bracket, generally speaking, is well known in the art. Moreover, reference will be made herein to respective upper and lower rotor brackets. It should be understood that such rotor brackets may be a single unitary structure, or alternatively, may be individual bracket components or maybe coupled or otherwise connected together as would be understood in the art. That is, as will be understood herein, reference to the first and second rotor arms (or third and fourth rotor arms, as the case may be) being hingedly coupled to their respective rotor brackets should be understood that there may be a single upper (and lower, as the case may be) rotor bracket or the upper and lower rotor brackets, as the case may be, may be in components or sections, and therefore the claims should not be limited thereby.

Figure 4:
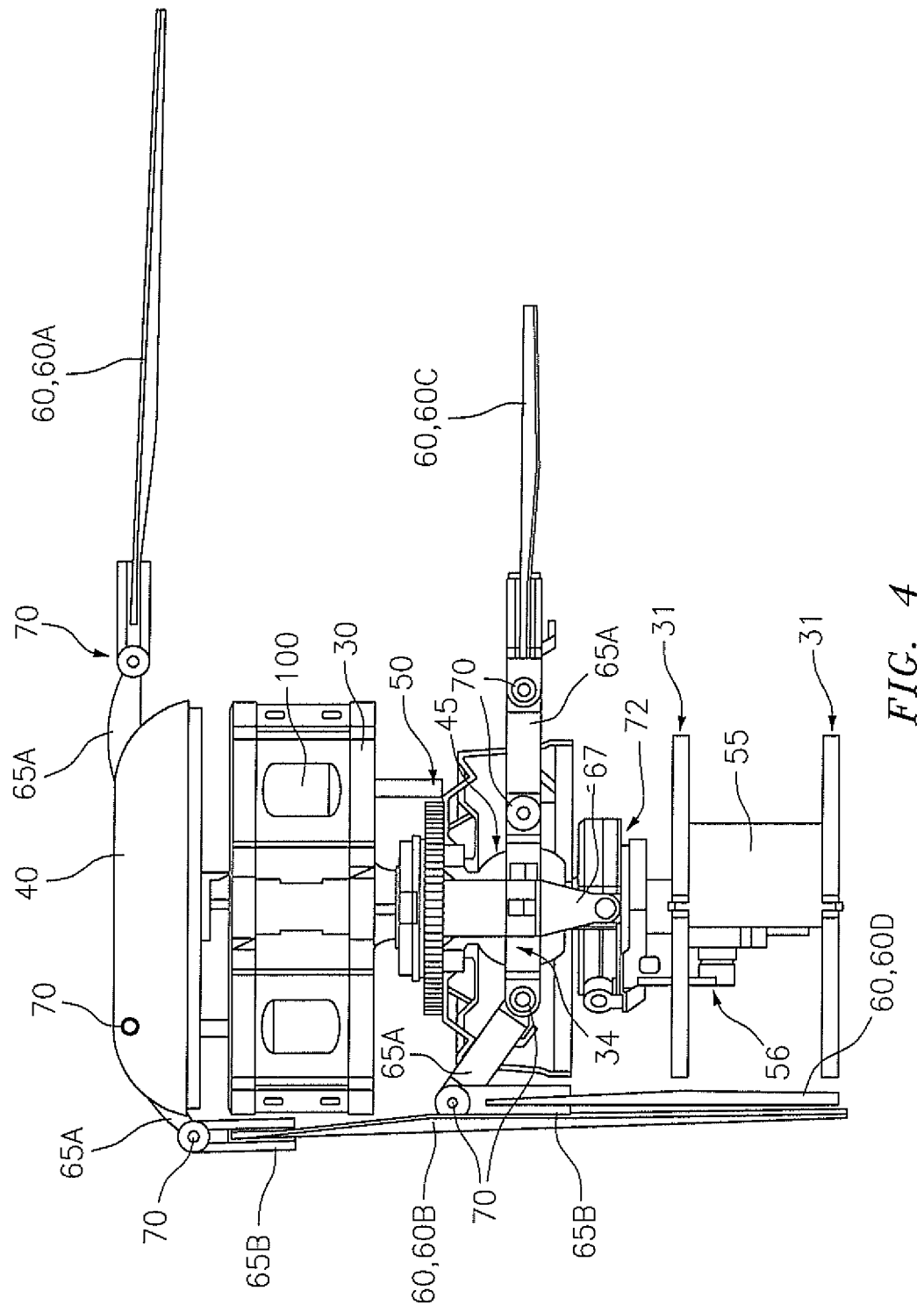
FIG. 4 illustrates features of an unmanned flying device constructed in accordance with a preferred embodiment of the present invention, in which the aerodynamic shells have been removed for ease of understanding.

Reference is now also made to FIG. 4, which illustrates each rotor 32, 34 being attached to the central shaft 25 via appropriately sized, radial, ball bearings, with thin bearings being the preferred, but not necessary choice. In the preferred embodiment, these bearings are embedded in rotor hubs 40, 45. Rotor hubs 40, 45 are preferably constructed from plastic, but other strong, lightweight material may be appropriate depending on the circumstances, considering such issues as design preference, user preferences, marketing preferences, cost, structural requirements, available materials, technological advances, and the like. Fixed to each rotor hub 40, 45, preferably with screws, is a respective and preferred 1.5" diameter, 72 tooth, nylon gear 50 which interfaces with an 8 tooth pinion of a respective electric motor, generally indicated at 100 (e.g. FIGS. 3, 4, 6), which serves to spin respective rotors 32, 34.

Under appropriate circumstances, considering such issues as design preference, user preferences, marketing preferences, cost, structural requirements, available materials, technological advances, or the like, rotors 32, 34 could be spun using other elements and methods such as belts or magnets or with gears and pinions of a variety of diameters and tooth count, as would be understood by one skilled in the art. Additionally, gears made of other suitable materials including metals, resins, etc. may be employed under appropriate circumstances. Additionally, attachment of the rotor hubs 40, 45 to the central shaft 25 by any suitable alternate method that would allow low friction spinning and proper support may be employed, and such alternative embodiments are contemplated herein. These alternate embodiments could include thrust bearings, magnetic bearings and air bearings, for example and not limitation.

As illustrated in FIGS. 3, 4 unmanned flying device 10 comprises four rotor blades, each of which are noted with reference number 60 and therefore can be referenced interchangeably or collectively as such, unless any specific rotor blade need be mentioned, and thus each rotor blade has been respectively referenced as 60A, 60B, 60C, 60D to avoid any confusion. Preferably, all of the blades 60 are constructed from carbon fiber, but other suitable strong and stiff materials with sufficient tensile strength could be used, including plastics, resins or other composites, or the like.

Each rotor blade 60 is coupled to its respective rotor and rotor hub by a respective coupling assembly having a rotor arm, generally indicated at 65. That is, rotor blades 60A, 60B are coupled to rotor 32 and rotor hub 40 while rotor blades 60C, 60D are coupled to lower rotor 34 and rotor hub 45. Each respective rotor arm 65 is preferably hingedly coupled to its respective rotor and rotor bracket by the use of hinges, generally indicated at 70.

Figure 5:
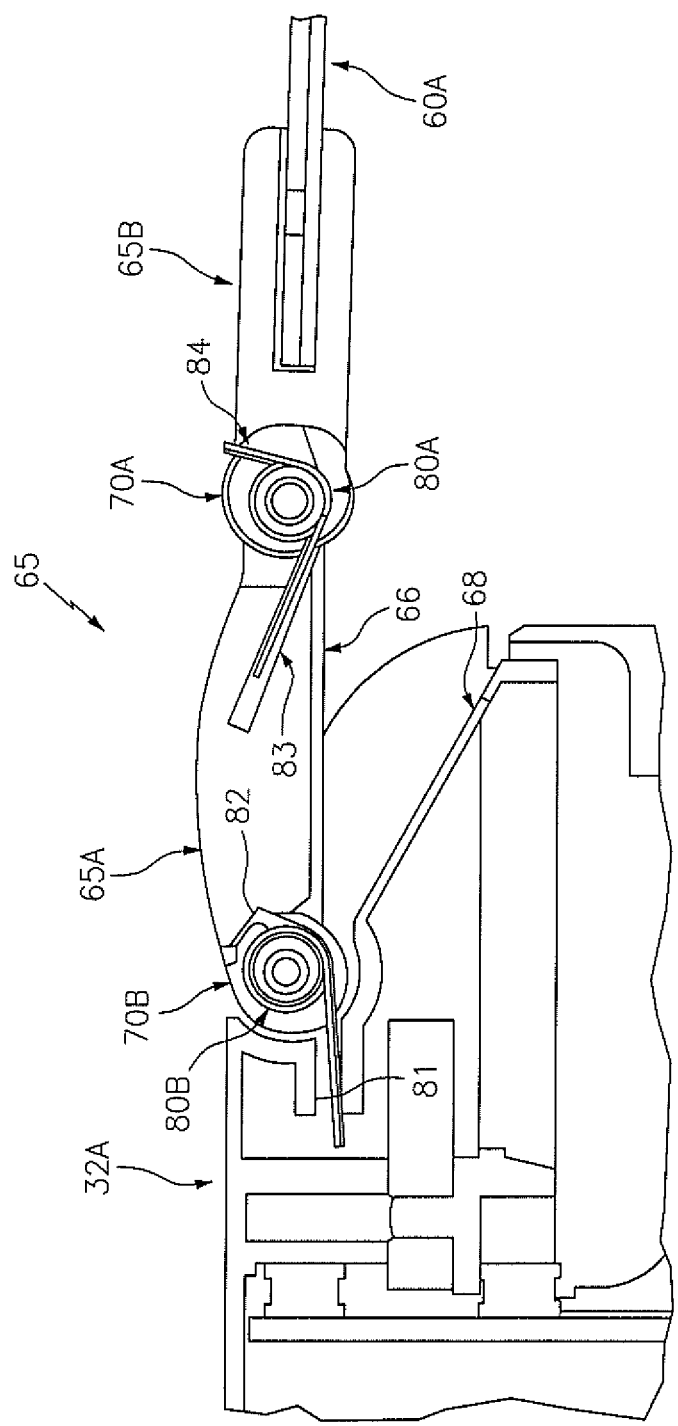
FIG. 5 is an enlarged view of the top rotor of a preferred embodiment of the unmanned flying device of the present invention, illustrating torsion springs in the rotor arm hinges to help achieve the advantages and objectives as set forth herein.
Figure 5A:
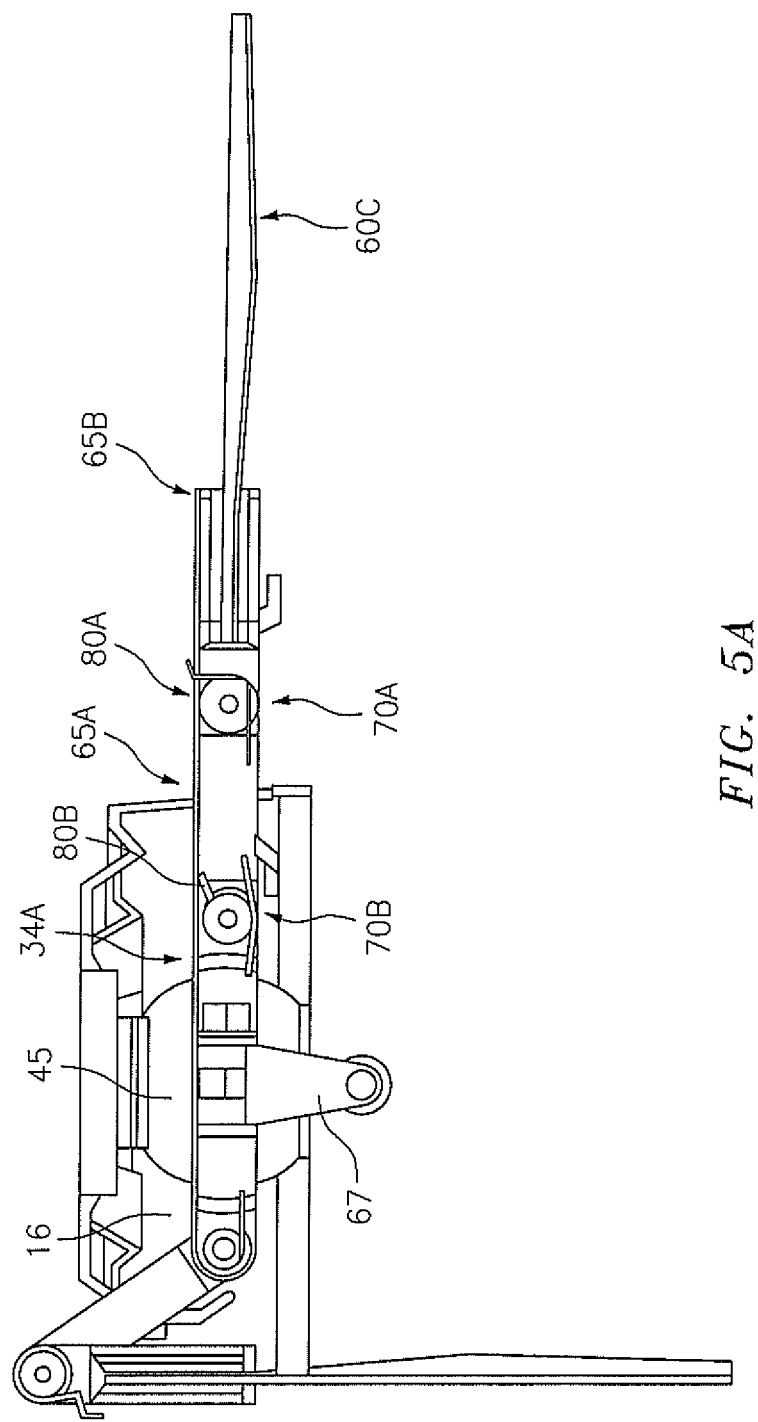
FIG. 5A is an enlarged view of the bottom rotor of a preferred embodiment of the unmanned flying device of the present invention, illustrating torsion springs in the rotor arm hinges to help achieve the advantages and objectives as set forth herein.

In a first discussed embodiment and with particular reference to FIGS. 5, 5A, the coupling assembly may utilize a dual hinge configuration. Hereinafter, reference will be made to FIG. 5B in connection with an alternative preferred embodiment where the coupling assembly utilizes a single hinge configuration. Generally speaking, the use of hinges 70 and the disclosed rotor arms as configured herein allow each of the associated rotor blades 60 to be folded or retracted down along the outer aerodynamic shells 12, 14, 16 of the unmanned flying device 10 when the respective rotors 32, 34 are rotating sufficiently slow enough (as discussed below) and/or are not spinning. Among other things, this construction makes unmanned flying device 10 more convenient to pack and transport, and assists in protecting blades 60 while not in use, along with minimizing damage to the device 10 itself during landing or a crash.

For example, with reference to FIGS. 5, 5A, the use of hinges 70A, 70B and rotor arm 65 with each rotor blade 60, allows each of the associated rotor blades 60 to be folded or retracted down along the outer aerodynamic shells 12, 14, 16 of the unmanned flying device 10 when the respective rotors 32, 34 are rotating sufficiently slow and/or are not spinning.

In this first embodiment, each rotor arm 65 may be preferably comprised of two sections, namely rotor arm sections 65A and 65B, hingedly coupled together at hinge 70A. Each rotor arm is preferably made of plastic, but other suitably strong and stiff materials could be used. As noted in FIGS. 1, 1A, respective sections 65B of each rotor arm 65, when retracted, is preferably sized to fold and conform to the profile of the unmanned flying device 10. In a particular embodiment, the blades are at least essentially parallel to the body of the device when in their collapsed position. While parallel might be preferred, at least essentially parallel is intended to mean within about 90% of parallel.

As shown in FIG. 4, each respective section 65A of rotor arm 65 may likewise pivot upward (i.e. in connection with blades 60C, 60D) or downward (i.e. in connection with blades 60A, 60B) as the case may be, to permit the collapsing or folding of the blade 60 associated therewith.

A discussion of the coupling assembly and the construction of rotor arm 65 associated with blade 60A (with the construction of rotor arm 65 associated with blade 60B being of an identical construction) and the coupling assembly and the construction of rotor arm 65 associated with blade 60C (with the construction of rotor arm 65 associated with blade 60D being of an identical construction therewith) will now be made.

In connection with this two (2) hinged first embodiment, in each of the four (4) associated rotor arm/blade configurations, two (2) torsion springs are provided, which in a preferred embodiment, are wire torsion springs. For example, with reference to the rotor arm 65/blade 60 configurations associated with blade 60A in FIG. 5, a first torsion spring 80B is provided at the hinge 70B between rotor bracket 32A and section 65A of rotor arm 65. A first end of spring 80B is secured within a channel 81 in bracket 32A while a second end of spring 80B is in contact with a shoulder 82 of section 65A. A second torsion spring 80A is provided at the hinge 70A between section 65A and section 65B of rotor arm 65, and in a similar manner, a first end of spring 80A is secured within a channel 83 in section 65A while a second end of spring 80A is in contact with a shoulder 84 of section 65B. An identical construction is preferably used in connection with blade 60B. Similarly, with reference to the rotor arm 65/blade 60 configuration associated with blade 60C in FIG. 5A, a first torsion spring 80B is provided at the hinge 70B between rotor bracket 34A and section 65A of rotor arm 65 and a second torsion spring 80A is provided at the hinge 70A between section 65A and section 65B of rotor arm 65. An identical construction is preferably used in connection with blade 60D. Similar constructions at the hinge joints are used in connection with the rotor arms of these lower rotor blades 60C, 6D. That is, the ends of the respective springs associated with the rotor arm sections of each blade 60C, 60D are secured within respective channels in a similar manner as discussed above and disclosed with respect to FIG. 5.

Figure 1:
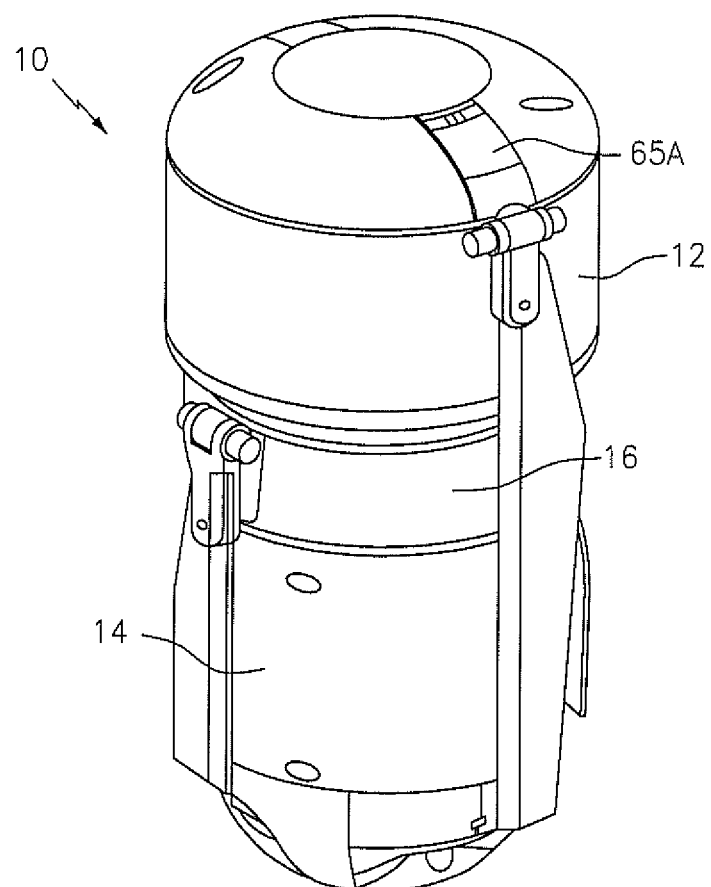
FIG. 1 is an isometric view of an unmanned flying device constructed in accordance with a preferred embodiment of the present invention, illustrating its rotor blades in a "folded" or a "collapsed" position.
Figure 1A:
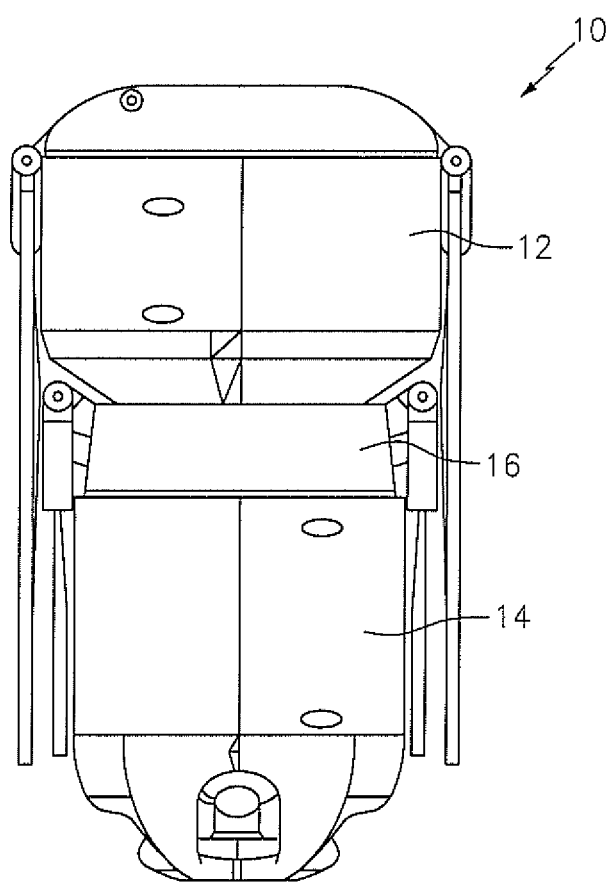
FIG. 1A is a side view of the unmanned flying device illustrated in FIG. 1.
Figure 2:
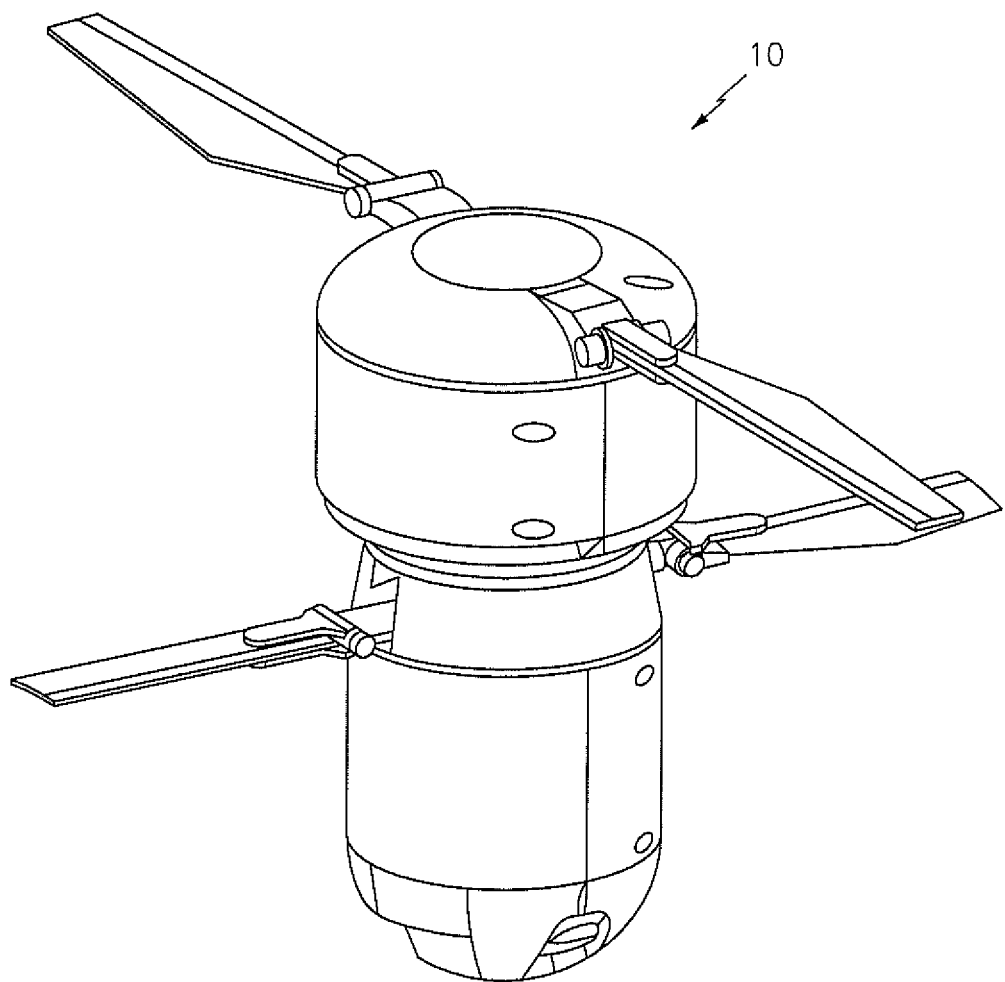
FIG. 2 is an isometric view of the unmanned flying device illustrated in FIGS. 1, 1A illustrating its rotor blades in an extended or "deployed" position.

The torsion provided by each of the respective springs 80A, 80B in FIGS. 5, 5A and the kinematics of the respective rotor arms and hinges force the associated rotor blades 60A, 60B, 60C, 60D to fold and retract along the profile of the body of unmanned flying device 10 when not experiencing external forces, as illustrated in FIGS. 1, 1A. As illustrated in FIG. 5, the spring force of spring 80B causes section 65A of rotor arm 65 associated with blade 60A to rotate downward until the lower surface 66 thereof is against surface 68 of rotor 32. In this way, section 65A is as compact as possible in the event of a landing, crash or during transport (see FIG. 1). Section 65A associated with blade 60B likewise folds downward (see FIG. 4). However, as the rotors 32, 34 spin, the centrifugal forces and the aerodynamic lifting force of the blades cause the blades 60 to deploy outwardly and into their extended positions (e.g. FIG. 2) necessary to generate lift. However, if either rotor 32, 34 stops spinning (or is spinning slow enough) the centrifugal forces are once again lost (or sufficiently reduced) and the blades 60 associated with that stopped (or slowing) rotor collapse and fold back along the body.

Several references are made herein to the fact that blades 60 will be caused to fold downwardly upon the cessation of the (or the sufficiently slow) rotation thereof. That is, as would be understood by those skilled in the art, the threshold at which rotor blades 60 will automatically fold or collapse along the body of the device 10 does not require complete cessation of rotor rotation but will occur in accordance with the dynamics of the system and at a point in which the forces urging the full deployment (centrifugal and aerodynamic) thereof are overcome by the spring force of torsion springs 80. That is, folding will occur when the RPM of the rotor decreases to a point at which the force moment (torque) about the rotor's respective hinges 70A or 70B induced by the centrifugal and aerodynamic forces acting on the rotating blades 60 are overcome by the torque induced on the hinges 70 by the torsion springs 80.

Therefore, it should also be understood by those skilled in the art that rotor blades 60 will also automatically fold or collapse along the body of the device 10 when there is a lack of sufficient force urging the full deployment thereof. Sufficient force should be understood to mean the torque required about hinges 70A or 70B to overcome the closing torque induced by each hinge's respective torsion spring 80. For example, experimental data has determined that if a blade with a mass of 15 grams and a center of gravity located 5 inches from the axis of rotation is rotating with an angular velocity of 750 RPM or greater, a 180 degree torsion spring with a torque value of 0.150 in-lbf when its legs are deflected 180 degrees, will be overcome and the blade will deploy, as would be understood in the art such that they may be slightly "coned" above perpendicular (by as much as 10 degrees). Also control inputs into the aft rotor may cause the blades to be slightly above or below perpendicular (tilting of the rotor plane), again this is about +/−10 to 15 degrees. In this way, aerodynamic lifting forces are generated necessary for flight. Those skilled in the art would easily be able to use such an exemplary embodiment to extrapolate such forces and rotational speeds to other sized blades and unmanned flying device constructions as set forth herein, generally.

It should be noted that alternative preferred rotor arm configurations and coupling assemblies are contemplated, which may utilize fewer (or which may require an increased number of) hinges 70 or rotor arm sections.

For example, reference is thus made to FIG. 5B for a disclosure of just such another preferred embodiment, wherein for simplicity and weight savings among other advantages, it may be advantageous to only have a single folding hinge 70 associated with each rotor arm 65. FIG. 5B shows such an embodiment as implemented on a possible aft rotor 34 with its left side "L" showing a rotor blade 60 in the retracted position and the right side "R" showing a rotor blade 60 in its extended or deployed position. Some components are removed for clarity and ease of understanding.

That is, and similar in all other respects to the embodiments described above, each rotor blade 60 is coupled to its respective rotor and rotor hub by a respective rotor arm, generally indicated at 165. Specifically, FIG. 5B illustrates each rotor arm 165 coupled to a respective rotor bracket 134A with the use of a hinge 170, which provides that each rotor arm 165 with each rotor blade 60 to be folded or retracted down along the outer aerodynamic shells 12, 14, 16 of the unmanned flying device 10 when the respective rotors 32, 34 are similarly not rotating fast enough or otherwise not spinning. Among other things, this alternative construction also makes unmanned flying device 10 convenient to pack and transport, and assists in protecting blades 60 while not in use, along with minimizing damage to the device 10 itself during landing or a crash.

Moreover, and again, similar to the embodiment described above, each rotor arm of this alternative embodiment is preferably made of plastic, but other suitably strong and stiff materials could be used and the coupling could be done with mechanical fasteners, press fit dowels, retaining pins or any other appropriately sized shaft or tube intended to act as an axle. With a single hinge embodiment as illustrated in FIG. 5B, each rotor arm 165, when retracted, is preferably sized to be low profile and conform to the outer mold line of the vehicle.

Each blade 60 is preferably attached to its respective arm 165 with a mechanical fastener, press fit dowels, retaining pins or any other appropriately sized shaft or tube intended to act as an axle. Other means could include adhesives, friction, "snap" fits or interference fits. Some embodiments will find it advantageous to have the blade 60 and associated arm 165 made as a single part that shares both their features. Such a blade that contained the features of the arm 165 could be made through injection molding of resins and plastics, carbon fiber layup or any other suitable method.

It should also be understood that the coupling assemblies that respectively couple blades 60A, 60B to the upper rotor 32 (e.g. rotor bracket 32) could likewise include only one hinge each. That is, instead of the upper coupling assemblies that utilize the dual hinge construction of FIG. 5A, blades 60A, 60B could instead also utilize a single hinge assembly as set forth in FIG. 5B.

In all other respects, the single hinge construction for each of the coupling assemblies for blades 60A, 60B, 60C and 60D is preferably identical to the double hinge construction as set forth above.

It should also be noted that for designs not using the coaxial configuration, the arms and blades of each rotor could fold and conform along any convenient surface, which would enhance the ability for the unmanned flying device to be transported and handled while not in operation.

It should be further noted that other suitable methods and means of construction of inducing the folding motion of the blades 60 could be employed in alternative embodiments, such as using elastics, linear springs, magnets and/or a combination thereof, and such means of construction, alone or in combination, could be further used in lieu of or in combination with the disclosed torsion springs, as long as the retracting force of the spring, elastic, magnet or other device(s) can be overcome by the centrifugal forces generated by the spinning rotor blades 60 and it can be ensured that the blades 60 remain fully extended during flight, or at least until the design parameters are such that retraction or folding is desired (e.g. upon very close to landing and/or crashing, as the case may be).

Advantageously, rotor blades 60 that automatically fold or collapse along the body of the device 10 as disclosed herein allows, provides and/or otherwise permits embodiments hereof to omit landing gear configurations, legs or supports, which might otherwise adversely affect the advantageous compact design and low cost of manufacturing of the present invention. That is, because the rotor blades 60 retract or collapse as disclosed herein, such blades need not be otherwise protected during landing or crashing to prevent damage thereto. Such a construction, among other things, provides for improved safety while using the devices as set forth herein, improved minimization of damage to the device itself, and a significant savings in manufacturing costs, weight and size, among other things, because structure to assist in landing is not necessary. That is, because unmanned flying device 10 can halt its rotors prior to landing, the loss of centrifugal force would result in the blades retracting and folding prior to the crash or landing, thereby protecting them during a belly or otherwise "hard" landing.

Reference is again made to FIGS. 4 and 5A for a discussion of providing a controlled flight, which is achieved by changing the relative pitch or "feather" of the bottom rotor blades 60C, 60D (cyclic pitch), although noting again for the avoidance of doubt that the single hinge configuration operates at least similarly, if not identically thereto. This change in relative pitch is achieved with linkages, generally indicated at 67, which connect the bottom rotor 34 to a swashplate, generally indicated at 72. The swashplate 72 is in turn connected via linkages to a pair of servo motors 55 which can change the angle of the swashplate 72. As is understood by those skilled in the art, the bottom rotor bracket 34A pitches or "feathers" on internal radial bearings in response to the induced angle of the swashplate as it rotates about the central shaft 25. In a preferred embodiment, the swashplate 72 is constructed from plastic and contains an internal, radial ball bearing which pivots on a plastic spherical bearing. The linkages 67 are preferably made from stainless steel or plastic and connect to the servo horns 56 and swashplate 72 with snap together, plastic ball-and-socket joints or traditional hinges. However, under appropriate circumstances, considering such issues as design preference, user preferences, marketing preferences, cost, structural requirements, available materials, technological advances, or the like, other methods of connecting linkages could be employed, such as universal joints or hinges. Preferably, the material of any such linkages and swashplate as contemplated herein is lightweight, stiff and of an appropriately strong material, as would be understood in the art.

According to further alternative embodiments, it may be advantageous to use cyclic pitch control applied to both the top and bottom rotors 32, 34 or have a mechanism for collective pitch control of the rotors 32, 34 or utilize three or more servo motors to control the pitch applied to the swashplate or achieve directional control by shifting the center of gravity of unmanned flying device 10, depending on the circumstances and as would be understood in the art.

Figure 6:
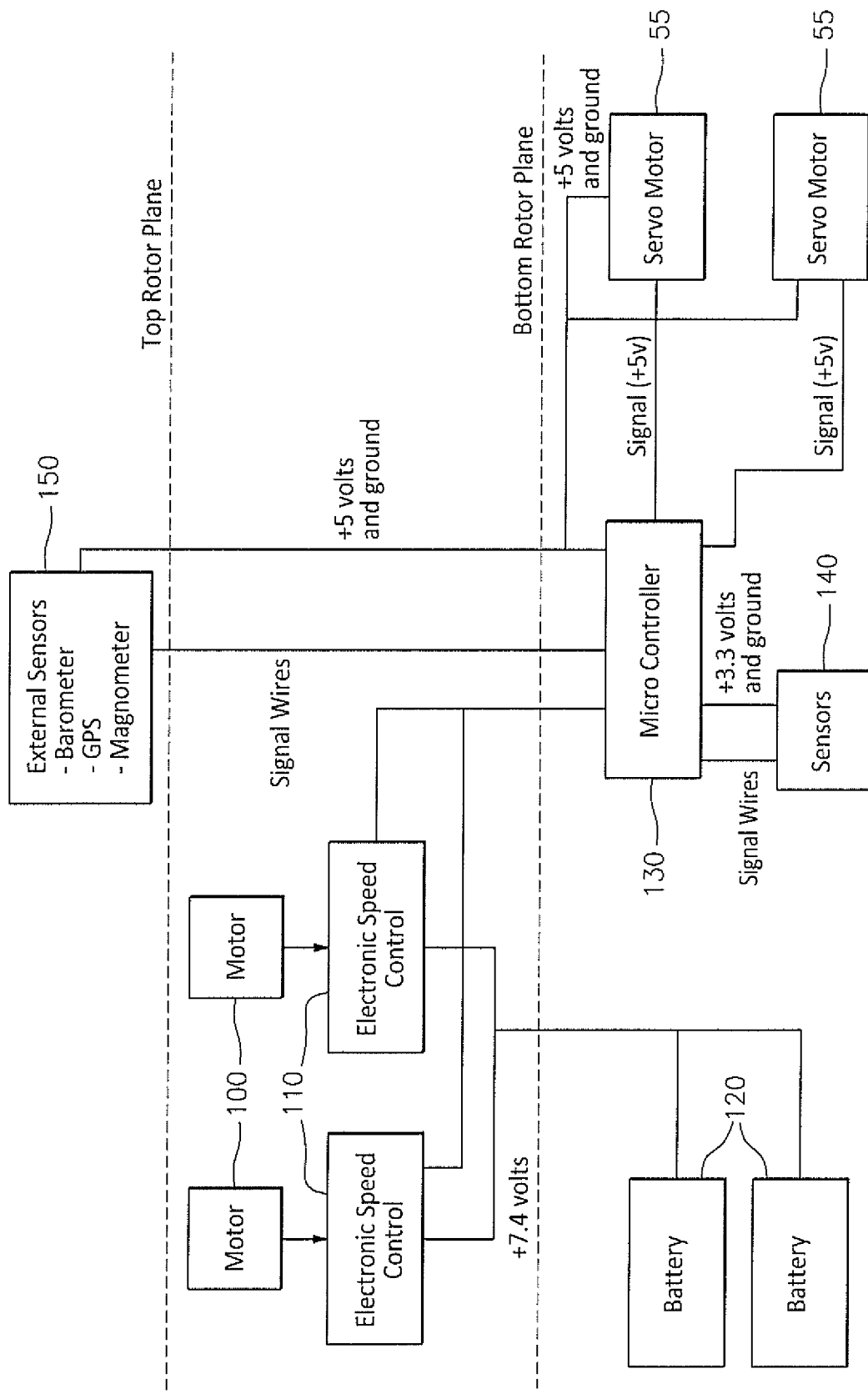
FIG. 6 is a block and electrical wiring diagram for an unmanned flying device constructed in accordance with a preferred embodiment of the present invention.

Reference is now also made to FIG. 6, which illustrates an electrical wiring and block diagram for unmanned flying device 10, constructed in accordance with a preferred embodiment of the present invention, and which is applicable to all constructions and embodiments disclosed herein.

Preferably, unmanned flying device 10 comprises and is powered by two (2) 1.1 inch diameter, 7.4V, brushless, electric motors, each generally indicated at 100, wherein a respective one of the motors 100 drives rotor 32 while the other motor 100 drives rotor 34. Motors 100, 100 are preferably located between the top and bottom rotors, as illustrated in FIG. 3 and are preferably mounted with screws to plastic brackets on the central shaft 25. Each electric motor 100, 100 is preferably controlled by a respective one 20 amp, electronic speed controller (ESC) 110 positioned in close proximity to its respective motor 100. The two motors 100, 100 and two controller 110 are preferably powered by a pair of 1300 mAh, 2 cell, Lithium Polymer (LiPo) batteries 120, 120 located beneath the bottom rotor. Preferably, the LiPo batteries 120, 120 are secured in place with cutouts in bulkheads. Preferably as well, the electrical wires (not shown) are routed up the central shaft 25 to connect the batteries, and control wires from the controllers 110, 110 are routed down the central shaft 25 to a microcontroller/microprocessor 130.

Microcontroller or microprocessor 130 may also be provided with appropriate power regulators. Additionally, microelectromechanical sensors, which may include by example and not limitation, gyroscopes, accelerometers and magnetometers, may be provided and indicated generally at 140. In addition, an electrical barometer and/or a Global Positioning System (GPS) receiver may be provided, which is also generally indicated at 150. The microcontroller 130 preferably uses one or more of the microelectromechanical sensors 140 to predict the orientation of the unmanned flying device during flight. The microcontroller 130 may then use this prediction to apply control signals to the servomotor 55, which may modify the angle of the swashplate 72 producing rotation of unmanned flying device 10 due to the change in relative pitch of the lower rotor blades 60C, 60D. The microcontroller or microprocessor 130 can use this control to fly autonomous missions or to enhance stability while a user is controlling it via a wire or wireless remote. Additionally, the GPS receiver and/or barometer, if provided, can provide information about the position of unmanned flying device 10 relative to the earth, which the microcontroller 130 can then use to fly to particular locations or maintain a particular altitude. Other electrical sensors, such as an ultrasonic range sensor or a camera, could also be added to provide additional (and/or more precise) distance information or imagining capability to unmanned flying device 10. A variety of antennas and transmitters could also be installed, thus providing unmanned flying device 10 with the ability to send or receive text messages or emails, broadcast emergency beacons or alerts or enhance the range of the user's radio or cellular phone. These sensors and electrical components could be mounted below, above or between the planes of the rotors due to the ability to route wires through the central shaft 25.

FIG. 6 also shows the preferred wiring configuration between and among the components illustrated therein.

As can thus be seen, the present invention relates to an improved unmanned flying device (e.g. drone system) comprising a body and foldable blades, whereby rotation of the blades causes the blades to extend and deploy via centrifugal force. A collapsing force (e.g. via a spring or elastic element) causes the blades to automatically fold when not rotating (or rotating at a sufficiently low enough speed, as disclosed above). According to a preferred embodiment, the blades fold to conform to the device's body making the device 10 compact and provide protection for the blades. Preferably, the unmanned flying device of the present invention comprises a co-axial rotor design preferably comprising at least two rotors aligned on a central axis. Each rotor includes at least two blades which provide a propulsive lift when spun. The preferred embodiments may also comprise a camera for aerial surveillance. The device's compactness and durability make it easy to carry and use by hikers wishing to gain an aerial view of the terrain.

The preferred embodiment utilizing two motors reduces the total size, weight and complexity compared to traditional multirotors. Additionally, the co-axial design allows the device's components in be located along a central shaft where they are easily protected by the outer shell 12, 14, 16. The present invention can be remotely controlled using communications such as radio control (R/C), Bluetooth, a tether or other appropriate means. The device could also operate autonomously, making and directing flight decisions with the onboard computer processor or microcontroller 130 as well as the necessary supporting electrical sensors, motors, speed controllers and other components. The above system may be utilized in various applications including aerial surveillance, delivery, amusement (e.g. helicopter toys), applications for similar drone systems which are currently used or will become available with emerging technologies. The present invention is also well suited for use by hikers wherein the compact and light design may be placed in a backpack, and used for surveillance of hidden terrain.

Preferably, device 10 can be hand launched and is capable of quickly ascending to several hundred feet. Furthermore, device 10 may be manufactured by methods such as 3D printing, injection molding, etc. or combinations thereof. In a preferred embodiment, the overall size of the unmanned flying device 10 is approximately 15 inches.

While the foregoing are preferred embodiment constructions of the present invention, it should be understood that other contemplated alternative embodiments may comprise a wide range of different motors, electronic speed controllers and battery types, voltages and capacitance to optimize performance, as should be understood in the art.

It can thus be seen that the present invention provides for an improved unmanned flying device over that currently found in the art. In particular, the present invention provides an improved unmanned flying device construction that can be utilized for a variety of applications, including aerial surveillance, amusement, and the delivery of items. Most significantly and among other things, the present invention provides an improved unmanned flying device construction that is both convenient and practical to use, and that is also compact, durable and can be manufactured at a relatively low cost and that includes blades which are biased towards folding to conform to the body of the unmanned flying device so as to minimize or prevent, among other things, damage to the device itself upon a landing or crash.

As noted above, the biasing of the torsion springs or other biasing devices as disclosed herein act to collapse the blades to preferably the profile of the unmanned flying device 10. As also stated above, collapsing the blades to be parallel to the body of the device when in their collapsed position is preferred, although at least essentially parallel is intended to mean within about 90% and also preferred. However, for the avoidance of doubt, the collapsing of the blades must be at least 45 degrees down. In this way, the present invention is patentably distinguishable from other merely "flapping", whereby the present invention provides that the blades "collapse" such that they are folded down and away from a position where they produce the necessary aerodynamic lift in the "up" direction needed for controlled flight. As discussed earlier herein, a controlled flight may still yield that the blades "flap" about +1-15 degrees away from perpendicular due to control inputs and blade coning. As would be understood by those skilled in the art, after a collapse of 45 degrees or greater there will not be any further controlled flight. In the foregoing way, the present invention achieves the objectives and advantages set forth herein, and in this way, patentability distinguishes the claimed invention from other blades which might sag or otherwise bend simply due to their own weight or component tolerances of the rotor arms, etc.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It should also be understood that the following claims are intended to cover all of the generic and specific features of the invention described herein and all statements of the scope of the invention that as a matter of language might fall therebetween.

To be sure, the present invention is applicable to a wide variety of devices and applications. That is, while the following embodiments have been disclosed with reference to an unmanned flying device, such a general description is intended to include, and therefore should be understood and deemed to encompass devices such as unmanned drones, and drones as would be used in the recreational sense.

What is claimed is:

1. An unmanned flying device, comprising:
   a body;
   a first rotor to which is coupled at least a first blade;
   at least a second rotor to which is coupled at least a second blade;

wherein the first and second rotors are mounted along a common vertical axis;
a coupling assembly for coupling the first blade and the at least second blade to the body, wherein the coupling assembly applies a force that urges the collapsing of the first blade and the at least second blade towards the body;
wherein both the first blade and the at least second blade are rotatable about the body, and wherein the first blade and the at least second blade are deployable away from the body via rotation of the first and the at least second blades about the body when the rotational and aerodynamic forces associated with the rotating blades exceeds the force that urges the collapsing of the first blade and the at least second blade towards the body, and
wherein controlled flight is achieved by only changing the relative pitch of the at least second blade coupled to the second rotor.

2. The unmanned flying device as claimed in claim 1, comprising a first motor for causing the rotation of the first blade about the body and at least a second motor for causing the rotation of the at least second blade about the body.

3. The unmanned flying device as claimed in claim 1, wherein without a sufficient force acting upon the first blade and the at least second blade to deploy the first and the at least second blades away from the body, the force applied by the coupling assembly will cause the first blade and the at least second blade to collapse toward the body.

4. The unmanned flying device as claimed in claim 1, wherein the coupling assembly comprises a rotor bracket and a rotor arm, wherein the rotor arm couples the first blade to the rotor bracket, and wherein the rotor arm is hingedly coupled to the rotor bracket, wherein the unmanned flying device further comprises:
a first spring positioned at the hinge, and wherein the first spring biases the first blade towards the body to thereby urge the first blade towards the body.

5. The unmanned flying device as claimed in claim 4, wherein the rotor arm comprises a first rotor arm section having a first end and a second end and a second rotor arm section having a first end and a second end, and wherein the first end of the first rotor arm section is hingedly coupled to the rotor bracket, the first end of the second rotor arm section is hingedly coupled to the second end of the first rotor arm section, and the second end of the second rotor arm section is coupled to a first end of the first blade; wherein the unmanned flying device further comprises:
a second spring positioned at the hinge coupling the first end of the second rotor arm section to the second end of the first rotor arm section, and wherein the second spring also biases the first blade towards the body to thereby urge the first blade towards the body.

6. The unmanned flying device as claimed in claim 5, wherein the first spring and the second spring are torsion springs.

7. The unmanned flying device as claimed in claim 4, wherein the coupling assembly comprises:
a second rotor arm that couples the second blade to the rotor bracket;
a lower rotor bracket;
a third rotor arm and a fourth rotor arm coupled to the lower rotor bracket;
a third blade and a fourth blade, wherein the third blade is coupled to the third rotor arm and the fourth blade is coupled to the fourth rotor arm;

an upper rotor assembly comprising the first rotor and the first mentioned rotor bracket, wherein the first rotor arm and the second rotor arm are hingedly coupled to the upper rotor assembly; and
a lower rotor assembly comprising the second rotor and the lower rotor bracket, wherein the third rotor arm and the fourth rotor arm are hingedly coupled to the lower rotor assembly.

8. The unmanned flying device as claimed in claim 7, comprising:
a second spring positioned at the hinge between the second rotor arm and the first mentioned rotor bracket;
a third spring positioned at the hinge between the third rotor arm and the lower rotor bracket; and
a fourth spring positioned at the hinge between the fourth rotor arm and the lower rotor bracket.

9. The unmanned flying device as claimed in claim 8, wherein each of the first, second, third and fourth rotor arms comprise:
a first rotor arm section having a first end and a second end and a second rotor arm section having a first end and a second end, wherein the first end of the first rotor arm section is hingedly coupled to its respective rotor bracket; and
the first end of the second rotor arm section is hingedly coupled to the second end of the respective first rotor arm section, and the second end of each second rotor arm section is coupled to a first end of its respective blade; and
a rotor arm section coupling spring positioned at the hinge coupling the first end of the second rotor arm section to the second end of the first rotor arm section, and wherein the rotor arm section coupling spring also biases each respective blade towards the body to thereby urge each respective blade towards the body.

10. The unmanned flying device as claimed in claim 7, wherein the first rotor arm comprises only one hinged section coupling the first blade to the first mentioned rotor bracket and the second rotor arm comprises only one hinged section coupling the second blade to the first mentioned rotor bracket.

11. The unmanned flying device as claimed in claim 1, wherein in a collapsed position, the first blade and the at least second blade are positioned at least essentially parallel to the body.

12. An unmanned flying device, comprising:
a body;
a first rotor to which is coupled a first blade;
at least a second rotor to which is coupled at least a second blade;
a coupling assembly for coupling the first blade and the at least second blade to the body, and for urging the first blade and the at least second blade to collapse towards the body;
wherein both the first blade and the at least second blade are rotatable about the body, and wherein the first blade and the at least second blade are deployable away from the body via rotation of the first and the at least second blades about the body when the rotational and aerodynamic forces associated with the rotating blades exceeds the urging force that urges the first blade and the at least second blade towards the body, and
wherein controlled flight is achieved by changing the relative pitch of only the at least second blade.

13. The unmanned flying device as claimed in claim 12, comprising a first motor for causing the rotation of the first blade about the body and at least a second motor for causing the rotation of the at least second blade about the body.

14. The unmanned flying device as claimed in claim 13, wherein the first blade and the at least second blades will remain in a deployed position until the force urging the first blade and the at least second blade to collapse towards the body is greater than the force upon the first blade and the at least second blade due to the rotation thereof about the body.

15. The unmanned flying device as claimed in claim 12, wherein the first and the at least second blades will remain at least essentially parallel to the body until a sufficient rotational force is applied to the first blade and the at least second blade to deploy the first and the at least second blades away from the body.

\* \* \* \* \*